United States Patent [19]

Levy et al.

[11] 4,258,435

[45] Mar. 24, 1981

[54] MANIFOLD MULTIPLEXERS

[75] Inventors: Ralph Levy, Newton, Mass.; John D. Rhodes, Guiseley, England

[73] Assignee: Microwave Development Labs. Inc., Needham, Mass.

[21] Appl. No.: 1,480

[22] Filed: Jan. 8, 1979

[51] Int. Cl.³ .................................................. H04J 1/08
[52] U.S. Cl. ........................................ 370/72; 333/29
[58] Field of Search .................. 179/15 FO, 2.5 A; 333/126, 129, 132, 135, 168, 175, 212; 370/72

[56] References Cited

U.S. PATENT DOCUMENTS

| | | | |
|---|---|---|---|
| 2,526,573 | 10/1950 | Mason | 333/135 |
| 2,816,270 | 12/1957 | Lewis | 333/126 |
| 2,938,177 | 5/1960 | Vogelman | 333/126 |
| 3,121,847 | 2/1964 | Pakan | 333/212 |
| 3,895,190 | 7/1975 | Koob | 179/2.5 A |

OTHER PUBLICATIONS

IEEE Transactions on Microwave Theory . . . ; vol. MTT-18, No. 5, May 1970; "Input Manifolds for Microwave Channel Zink Filter", by Edson et al., pp. 270-276.
Comsat Technical Review; vol. 6, No. 2, Fall 1976; "A Contigous Band Multiplexer" by Chen et al.
1976 IEEE MTT-S Int'l Microwave Symposium Digest, IEEE Cat. No. 76Ch1087-GMTT, "Narrow Band Contigous Multiplexer Filters . . ." by Wenzel et al.
IEEE Transactions on Microwave Theory and Techniques; vol. MTT-25, No. 10, Oct. 1977; "Direct Design Formulas . . ." by Haine et al.
Microwaves, Optics and Acoustics; Sep. 1976; vol. 1, No. 1; "Direct Design of Symetrical Interacting Bandpass Channel Diplexers" by Rhodes.

*Primary Examiner*—David L. Stewart
*Attorney, Agent, or Firm*—Wolf, Greenfield & Sacks

[57] ABSTRACT

Bandpass channel filters are connected to a uniform impedance manifold. Immittance compensation is provided in a way that preserves the canonic form of the network while at the same time serving to separate the filters (channels) along the manifold. The manifold forms a phase shifter between each channel which is sufficient to compensate for filter interactions to thereby permit the design of contiguous or non-contiguous channel multiplexers. Design procedures are described for both a frequency independent manifold and a frequency dependent manifold. One design is of a waveguide WR229 manifold triplexer employing 37 MHz bandwidth 6-cavity Chebyshev filters having ripple return loss of 26dB (VSWR=1.1) with center frequencies at 3720, 3800 and 3880 MHz.

6 Claims, 10 Drawing Figures

MANIFOLD MULTIPLEXERS

BACKGROUND

The present invention relates in general to manifold multiplexers and pertains, more particularly, to a multiplexer comprising a number of filters connected to a manifold and designed so that there is no need for extra immittance compensation networks.

There are different approaches to the design of multiplexers, particularly those coupling to a manifold. Due to requirements in communication satellites and other applications, attempts have been made to produce manifold multiplexers. One important and difficult requirement is to provide an output multiplexer on a waveguide manifold with bandpass channels separated to yield guard bands of only say, for example, 10%. Most design techniques have adopted an approach based upon singly terminated bandpass channels resulting in 3 dB crossover points between channels. See for example the articles of R. J. Wenzel and W. G. Erlinger, "Narrowband contiguous multiplexing filters with arbitrary amplitude and delay response", 1976 IEEE MTT-S International Microwave Symposium Digest, IEEE Cat. No. 76CH1087-6MTT, pp. 116-118; and M. H. Chen, F. Assal and C. Mahle, "A contiguous band multiplexer", Comsat Technical Review, Vol. 6, No. 2, pp. 285-305, Fall 1976. These designs exhibit good return loss over the channel bandwidths and the guard bands. Dummy channels typically have to be included to simulate channels at the edges of the total multiplexer bandwidth, forming additional annulling networks. Thus, in the prior art it is quite common to require redundant elements to provide channel interaction compensation to produce a channel performance comparable to the individual channels based upon a singly terminated prototype.

The need for contiguous band multiplexers originally arose in receiver design for countermeasures where the incoming signal was unknown and complete band coverage was necessary with good match at all frequencies. In this case all channels have to be designed on a singly terminated basis and must provide a prescribed level of attenuation over the major part of other bands.

However, the requirements for multiplexers in communication systems are different since they must provide good reflection and transmission only over each channel bandwidth whilst maintaining high attenuation over all other channels. For typically realizable passband return loss specifications (e.g. 20 to 25 dB) the optimum solution leads to attenuation in excess of 10 dB at the crossover frequencies independent of the guardband bandwidth. Thus, contiguous band multiplexers are non-optimum in this situation and have probably been used because a design procedure was known. They result in a higher degree filter than necessary in each channel in addition to the annulling network. Furthermore, if one attempts to use singly terminated designs for crossover levels in excess of 3 dB, the passband return loss rapidly deteriorates if further annulling (immittance compensation) networks are not used.

The significant difference between the optimum design approach and the continguously designed solution to the above type of problem may be illustrated by the simpler diplexer examples presented in J. D. Rhodes, "Direct Design of Symmetrical Interacting Bandpass Channel Diplexers", I.E.E. Journal on Microwaves, Optics and Acoustics, Vol. 1, No. 1, pp. 34-40, September 1976. See in particular FIGS. 4 and 5 of that article. For the case of two non-contiguous bandpass channels of bandwidth 2 and guardband of 1, 5-cavity Chebyshev filters may produce a return loss 25 dB over each passband whilst 34 dB attenuation is achieved over the opposite channel, whereas the contiguous approach using similar 5-cavity filters gives an attentuation level over the opposite channel of only 19 dB. Thus the price paid for preserving the 25 dB return loss at the common port over the guardband region is a 15 dB reduction in the attenuation level in the stopband. Hence, for most applications in communication systems, contiguous band multiplexers result in designs far from the optimum solution.

Accordingly, it is an object of the present invention to provide an improved manifold multiplexer and one in particular that can be used for contiguous band operation. In accordance with the present invention the manifold multiplexer forms phase shifters displacing each of the filters forming the multiplexer with these phase shifter networks also forming immittance compensation means.

BRIEF SUMMARY OF THE INVENTION

The design procedures described herein are initially directed to a generalized multiplexer theory employing the direct connection of the filters without immittance compensation networks. From the formulas for this basic arrangement immittance compensation is provided by employing the filters in combination with a manifold and by spacing the filters along this manifold in a way which not only separates the filters physically but also makes use of phase shifters between channels to provide the immittance compensation. The improved multiplexer in accordance with this invention may even be designed for contiguous band coverage. The theory in accordance with the invention is developed first assuming that the phase shifters are frequency independent and secondly by assuming that these manifolds are frequency dependent. The theory of the present invention may be used in constructing multiplexers that have either widely spaced or contiguous channels. For example, a 10 channel manifold may be constructed in WR75 waveguide for the 14-14.5 GHz band. This device displayed substantially contiguous channels. In another version there may be provided a waveguide WR229 manifold multiplexer employing 37 MHz bandwidth filters with center frequencies at 3720, 3800 and 3880 MHz.

BRIEF DESCRIPTION OF THE DRAWINGS

The total design procedure of the present invention will become more apparent upon the reading of the following exposition taken in conjunction with the accompanying drawings, in which.

EXPOSITION

Direct design formulas are presented for bandpass channel diplexers in the following two papers: J. D. Rhodes, "Direct Design of Symmetrical Interacting Bandpass Channel Diplexers", IEE Journal on Microwaves, Optics and Acoustics, Vol. 1, No. 1, pp. 34–40, September, 1976 and J. L. Haine and J. D. Rhodes, "Direct Design Formulas for Asymmetric Bandpass Channel Diplexers", IEEE Trans. on Microwave Theory and Techniques, Vol. MTT-25, pp. 807–813, October, 1977. Herein, the design is extended to the general multiplexer case having any number of channels, arbitrary channel complexity, and arbitrary channel bandwidths and center frequency allocations. In the first place, design formulas are derived for interacting channel filters having direct connection without additional immittance compensation networks. In the second phase of the theory, consideration is given to the use of immittance compensation networks. In this regard, it has been found possible to design multiplexers on a manifold of uniform impedance using phase shifters between the filters on the manifold not only to serve to separate the filters physically but also to function as immittance compensation networks. The results are expressed in the form of closed formulas with little or no computer optimization required. The theory developed hereinafter may even be applied to the limiting case of contiguous band coverage.

In the J. D. Rhodes, and J. L. Haines and J. D. Rhodes article, supra there is described lumped element, doubly-terminated, individual channel filters operating in isolation. Herein, there are described formulas which are developed which compensate for the interaction which takes place when the channels are connected.

There exists a large variety of lumped element doubly-terminated lowpass prototype filters, ranging from the conventional Chebyshev filter through to linear phase filters with finite attenuation poles. For example, see J. D. Rhodes, "Theory of Electrical Filters", New York, Wiley, 1976. These types of filters normally have an equiripple passband amplitude response with the maximum number of ripples. Thus there is perfect transmission at n points $\omega = \omega_i$, $i = 1 \rightarrow n$, where n is the degree of the transfer function. Defining the set of numbers $\omega_i$ and the level of the equiripple behavior uniquely defines the filter even for elliptic function or linear phase filters. Furthermore, the set of numbers $\omega_i$ represents a very sensitive description of the transfer function in the sense that small variations will cause significant changes in the transfer function response. Thus, any modification to a filter due to interactions with any additional circuit elements tends to preserve this set of frequencies $\omega_i$ at which perfect transmission occurs.

Figure 1:
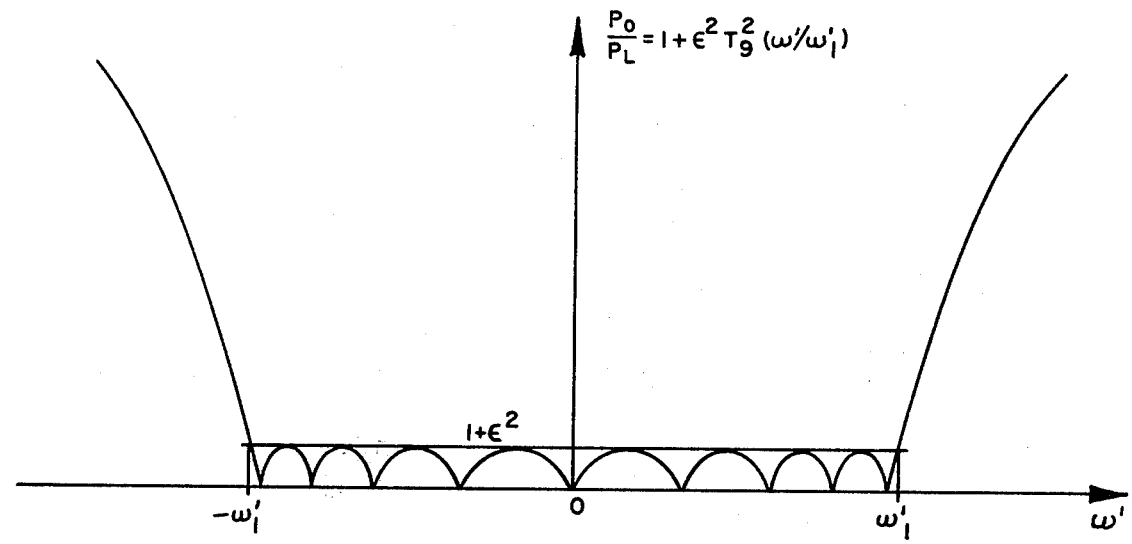
FIG. 1 shows an insertion loss response for a Chebyshev lowpass prototype filter with positive and negative frequencies indicated.
Figure 2:
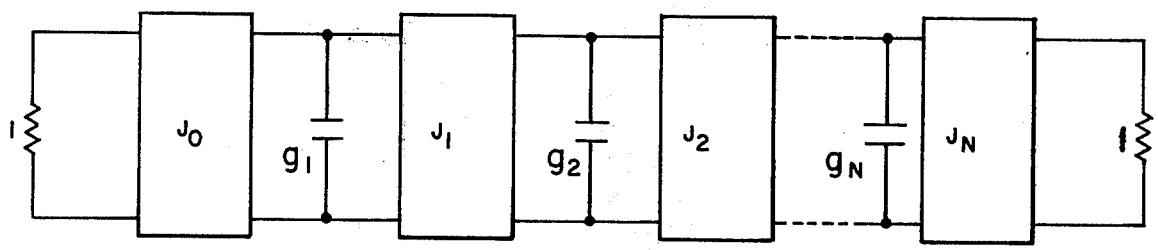
FIG. 2 shows the Chebyshev lowpass prototype filter employing ideal admittance inverters and shunt capacitors.

Optimum equiripple amplitude passband filters possess an electrically symmetric or antimetric realization. Additionally, a physically symmetrical prototype may always be synthesized using an even and odd mode decomposition. (J. D. Rhodes, "Theory of Electrical Filters", New York, Wiley, 1976). FIG. 1 shows the insertion loss for a Chebyshev lowpass prototype filter as depicted in FIG. 2. The insertion loss is given by the following formula;

$$P_O/P_L = 1 + \epsilon^2 T_N^2(\omega'/\omega_1')$$

where $$T_N(X) = \cos(N \cos^{-1} x)$$

With regard to the prototype of FIG. 2 the following formulas apply;

$$g_k = \frac{2 \sin\left[\frac{(2k-1)\pi}{2N}\right]}{\gamma \omega_1'} \quad (2)$$

$$J_k = \frac{\sqrt{\gamma^2 + \sin^2\left(\frac{k\pi}{N}\right)}}{\gamma}$$

$$\gamma = \sinh\left\{\frac{1}{N} \sinh^{-1}\frac{1}{\epsilon}\right\}.$$

$J_k$ is the characteristic admittance of the inverter between the $k^{th}$ and $(k+1)^{th}$ shunt capacitors. In a more general case similar realizations exist, often with cross coupling inverters between non-adjacent shunt capacitors. The theory which follows applies equally well to such filters, although slight modification will be necessary if a cross-coupling inverter at the first or second nodes is required. It may be noted that internal admittance scaling may be applied and for example all of the main line inverters could possess unity characteristic admittance (i.e. $J_k = 1$). Occasionally it is more convenient not to do this, such as in the Chebyshev filter where the formulas given in equation (2) are used, and we shall always assume that $J_o = 1$ for the unmodified (i.e. non-multiplexed) filter.

Figure 3:
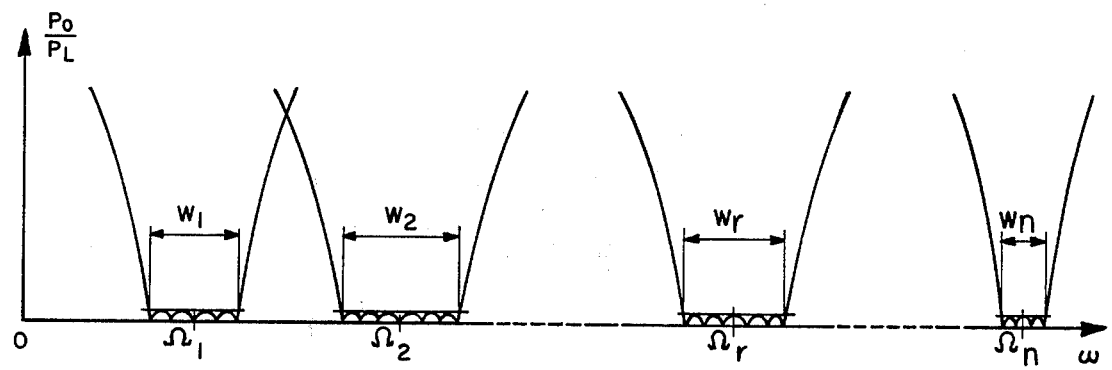
FIG. 3 shows the insertion loss characteristics of the direct connected multiplexer indicating notation for center frequencies and bandwidths.

The insertion loss characteristics of the n-channel multiplexer, indicating the insertion losses from the common port to the n output ports, is shown in FIG. 3. There is channel bandwidth $W_r$ centered at frequency $\Omega_r$, $r = 1 \rightarrow n$. Note that the ripple levels of the channels are not required to be identical. The $r^{th}$ channel is derived from the lowpass prototype, such as the Chebyshev Prototype of FIG. 1, using the frequency transformation $$\omega' \rightarrow \frac{2\omega_1'}{W_r}(\omega - \Omega_r) \quad (3)$$

This changes each prototype shunt capacitor $g_k$ into a capacitor;

$$C_{rk} = \frac{2g_k \omega_1'}{W_r} \quad (4)$$

in parallel with a frequency invariant reactance;

$$B_{rk} = \frac{-2\omega_1' g_k \Omega_r}{W_r} = -C_{rk}\Omega_r \tag{5}$$

Now consider scaling all of the center frequencies of each filter by a constant $\alpha$, so that the frequency transformation (3) is modified to $$\omega' \to \frac{2\omega_1'}{W_r}(\omega - \Omega_r\alpha) \tag{6}$$

This modification maintains the same bandwidth for each channel, but changes the channel separations. Thus for a $\alpha$ large, all of the guard bands are large, so that the interaction between filters in a parallel connection is reduced. In fact as $\alpha$ tends to infinity the filters will not interact, and the individual passband performances will be maintained in the multiplexer. For each channel, an increase of 6 dB in the attenuation level over the passband regions of all other channels occurs, due to the potential-divider action resulting from the input admittance of the other channels being in parallel with that of the reference channel.

As $\alpha$ is decreased towards the design requirement of unity, the channels interact. Any changes which are require in the element values of the channels may be expressed as a power series in $\alpha^{-1}$ with the leading terms being the original doubly terminated prototype values. The coefficients of the higher ordered terms may then be obtained such as to preserve the passband performances of each channel as $\alpha$ is decreased to unity. The criterion which is used is that the n frequencies $\omega_i$ of perfect transmission at both the common port and the appropriate channel port are preserved to a certain level of approximation. This criterion preserves the individual channel performance since, as stated earlier, the behaviour of any filter of the equiripple passband type is very sensitive with respect to the frequencies of perfect transmission.

In the simple case of parallel connection with no extra susceptance compensation networks, this process may be carried out exactly up to order $\alpha^{-2}$, giving a residual error term of order $\alpha^{-3}$, an expression for which may be derived.

Figure 4:
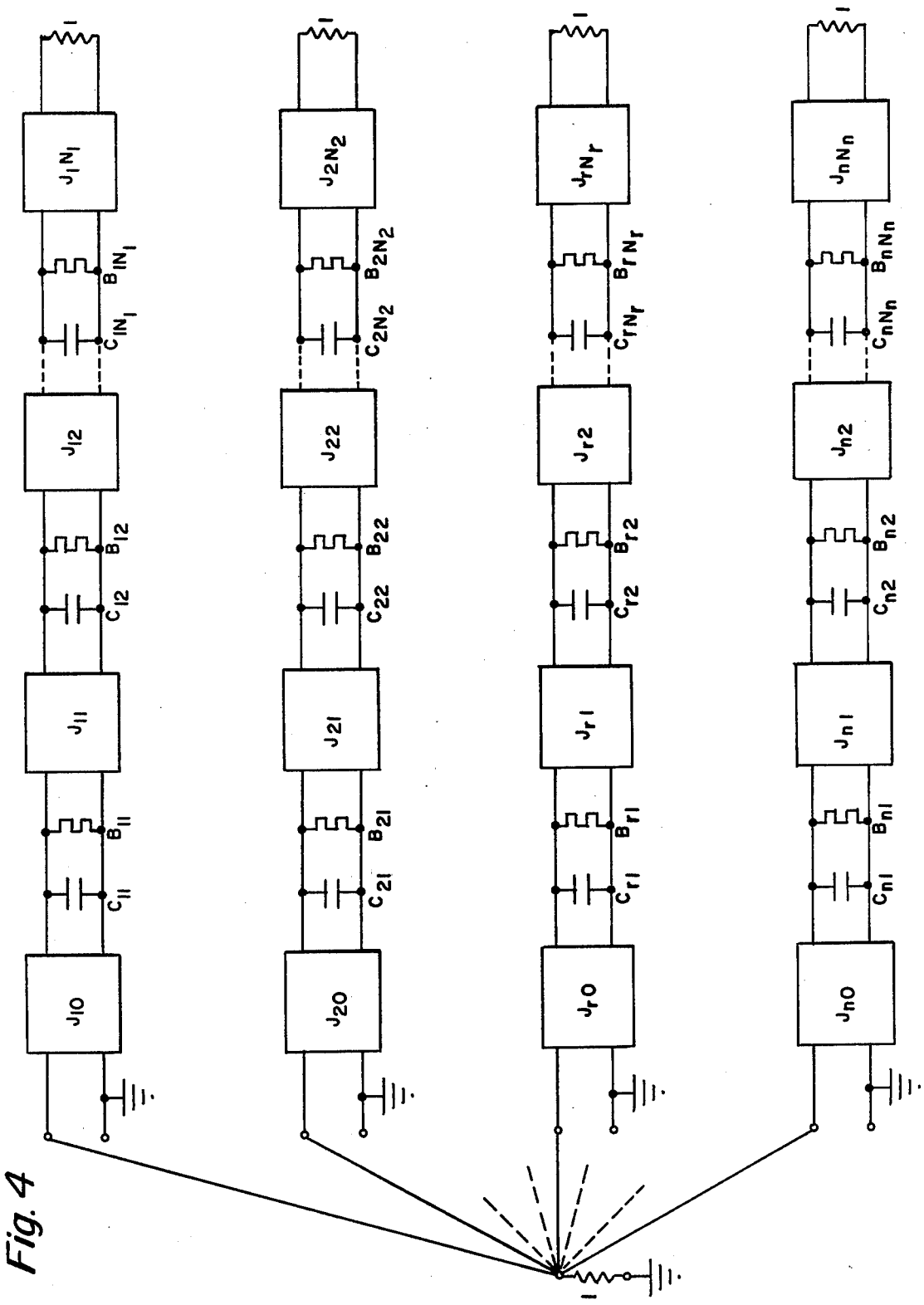
FIG. 4 shows an n channel parallel-connected multiplexer in accordance with an initial theory of the present invention but not including a manifold with phase shift compensation.

The n-channel parallel-connected multiplexer is now shown in FIG. 4. The degree of the $r^{th}$ channel is denoted by $N_r$, and the $k^{th}$ shunt admittance of the $r^{th}$ channel is given by $$Y_{rk} = jC_{rk}(\omega - \Omega_r\alpha) \tag{7}$$

The next step is to carry out modifications to the element values in order to maintain the original frequencies of perfect transmission $(\Omega_r\alpha + \omega_i)$. Following the reasoning given in the previous papers supra J. D. Rhodes, "Direct Design of Symmetrical Interacting Bandpass Channel Diplexers", IEE Journal on Microwaves, Optics and Acoustics, Vol. 1, No. 1, pp. 34–40, September 1976 and J. L. Haine and J. D. Rhodes, "Direct Design Formulas for Asymmetric Bandpass Channel Diplexers", IEEE Trans. on Microwave Theory and Techniques, Vol. MTT-25, pp. 807–813, October 1977 where it is shown that the impedance inverters must be an even function of $\alpha$, the frequency independent susceptances an odd function of $\alpha$, and that the shunt capacitors may be retained unchanged, we have $$J_{r0}^2 \to 1 - \gamma_{r02}\alpha^{-2} \tag{8}$$

$$J_{r1}^2 \to J_{r1}^2(1 - \gamma_{r12}\alpha^{-2}) \tag{9}$$

$$B_{r1} \to -C_{r1}(\Omega_r\alpha + \beta_{r11}\alpha^{-1} + \beta_{r13}\alpha^{-3}) \tag{10}$$

$$B_{r2} \to -C_{r2}(\Omega_r\alpha + \beta_{r23}\alpha^{-3}) \tag{11}$$

and all other elements are unchanged. The notation for the correction terms, $\gamma_{rkl}$ or $\alpha_{rkl}$, enables each such term to be associated with the $r^{th}$ channel, the $k^{th}$ element in that channel, and to a correction of order $\alpha^{-l}$. If further correction terms such as $\beta_{r21}$ or terms associated with a change in the values of the $C_{rk}$ were to be included, then the following mathematics would show that such terms are redundant, and may be set to zero.

An expression for the input admittance to the common port of the multiplexer will now be derived. It is necessary to derive the "in-band" input admittance to the $r^{th}$ channel and the "out-of-band" admittances to the other (n-1) channels within the frequency band of this $r^{th}$ channel. The required common port input admittance is then the sum of all these individual admittances.

The in-band input admittance to the $r^{th}$ channel in FIG. 4 at the original frequencies of perfect transmission $(\Omega_r\alpha + \omega_i)$ if given by;

$$Y_r(\Omega_r\alpha + \omega_i) = \cfrac{1 - \gamma_{r02}\alpha^{-2}}{jC_{r1}(\omega_i - \beta_{r11}\alpha^{-1} - \beta_{r13}\alpha^{-3}) + \cfrac{J_{r1}^2(1 - \gamma_{r12}\alpha^{-2})}{jC_{r2}(\omega_i - \beta_{r23}\alpha^{-3}) + G + jB}} \tag{12}$$

where $G + jB$ is the input admittance looking into the network remaining after the second shunt admittance. In deriving this equation we have included the modifications given by equations (8–11), and terms such as $C_{rk}$ are still related to the original lowpass prototoype element values by equation (4). The network represented by $G + jB$ is unmodified from the original, i.e. is independent of $\alpha$.

The key elmenet in the theory is now to express the fact that the input admittance is unity at the frequencies of perfect transmission for the original network, which is obtained by setting $\alpha = \infty$, i.e.

$$1 = \cfrac{1}{jC_{r1}\omega_i + \cfrac{J_{r1}^2}{jC_{r2}\omega_i + G + jB}} \tag{13}$$

or $$G + jB = \frac{J_{r1}^2}{1 - jC_{r1}\omega_i} - jC_{r2}\omega_i$$

This may now be substituted into (12), giving;

$$Y_r(\Omega_r\alpha + \omega_i) = \tag{14}$$

$$\cfrac{1 - \gamma_{r02}\alpha^{-2}}{jC_{r1}(\omega_i - \beta_{r11}\alpha^{-1} - \beta_{r13}\alpha^{-3}) + \cfrac{J_{r1}^2(1 - \gamma_{r12}\alpha^{-2})}{\cfrac{J_{r1}^2}{1 - jC_{r1}\omega_i} - jC_{r2}\beta_{r23}\alpha^{-3}}}$$

Expanding this expression as a power series in $\alpha^{-1}$ gives $$Y_r(\Omega_r \alpha + \omega_i) = \frac{1 - \gamma_{r02}\alpha^{-2}}{jC_{r1}(\omega_i - \beta_{r11}\alpha^{-1} - \beta_{r13}\alpha^{-3}) + (1 - \gamma_{r12}\alpha^{-2})(1 - jC_{r1}\omega_i)[1 + \frac{jC_{r2}\beta_{r23}}{J_{r1}^2}(1 - jC_{r1}\omega_i)\alpha^{-3}]} \quad (15)$$

$$= \frac{1 - \gamma_{r02}\alpha^{-2}}{1 - jC_{r1}\beta_{r11}\alpha^{-1} - (1 - jC_{r1}\omega_i)\gamma_{r12}\alpha^{-2} + \alpha^{-3}[-jC_{r1}\beta_{r13} + \frac{jC_{r2}\beta_{r23}}{J_{r1}^2}(1 - jC_{r1}\omega_i)^2]}$$

$$Y_r(\Omega_r \alpha + \omega_i) = 1 + jC_{r1}\beta_{r11}\alpha^{-1} + \alpha^{-2}[(1 - jC_{r1}\omega_i)\gamma_{r12} - \gamma_{r02} - (C_{r1}\beta_{r11})^2]$$

$$+ \alpha^{-3}[jC_{r1}\beta_{r13} - \frac{jC_{r2}\beta_{r23}}{J_{r1}^2}(1 - jC_{r1}\omega_i)^2 + 2jC_{r1}\beta_{r11}(1 - jC_{r1}\omega_i)\gamma_{r12}$$

$$- j\gamma_{r02}C_{r1}\beta_{r11} - j(C_{r1}\beta_{r11})^3] + \epsilon(\alpha^{-4})$$

where $\epsilon(\alpha^{-4})$ contains error terms in $\alpha^{-4}$ and below.

At the same set of frequencies $\Omega_r\alpha + \omega_i$ we may compute the input admittance of the $m^{th}$ out-of-band channel ($m \neq r$) as;

$$Y_m(\Omega_r\alpha + \omega_i) = \frac{1 - \gamma_{m02}\alpha^{-2}}{jC_{m1}[(\Omega_r - \Omega_m)\alpha + \omega_i - \beta_{m11}\alpha^{-1} - \beta_{m13}\alpha^{-3}] + \frac{J_{m1}^2(1 - \gamma_{m12}\alpha^{-2})}{jC_{m2}[(\Omega_r - \Omega_m)\alpha + \omega_i - \beta_{m23}\alpha^{-3}]}} \quad (16)$$

Here the admittance includes only the first two shunt elements, since the remaining terms in this out-of-band situation become insignificant. Equation 16 may be expanded in a power series in $\alpha^{-1}$ as follows:

$$Y_m(\Omega_r\alpha + \omega_i) = \frac{1 - \gamma_{m02}\alpha^{-2}}{jC_{m1}(\Omega_r - \Omega_m)\alpha[1 + \frac{\omega_i\alpha^{-1} - \beta_{m11}\alpha^{-2}}{\Omega_r - \Omega_m} - \frac{J_{m1}^2\alpha^{-2}}{C_{m1}C_{m2}(\Omega_r - \Omega_m)^2}]} \quad (17)$$

$$= \frac{-j\alpha^{-1}}{C_{m1}(\Omega_r - \Omega_m)} \cdot \left\{ 1 - \frac{\omega_i\alpha^{-1}}{\Omega_r - \Omega_m} + \alpha^{-2}[-\gamma_{m02} + \frac{\beta_{m11}}{\Omega_r - \Omega_m} + \frac{J_{m1}^2}{C_{m1}C_{m2}(\Omega_r - \Omega_m)^2} + \frac{\omega_i^2}{(\Omega_r - \Omega_m)^2}] \right\} + \epsilon(\alpha^{-4})$$

which is purely reactive apart from the error term. Summation of all these out-of-band admittances and adding to the in-band admittance of equation 15 gives the final expression for the input admittance of the multiplexer at frequencies $(\Omega_r\alpha + \omega_i)$ as $$Y_{in}(\Omega_r\alpha + \omega_i) = \underbrace{Y_r(\Omega_r\alpha + \omega_i)}_{(\text{equ. 15})} + \sum_{m=1 \neq r}^{n} \underbrace{Y_m(\Omega_r\alpha + \omega_i)}_{\omega(\text{equ. 17})} \quad (18)$$

By definition of the term, $\Omega_r\alpha + \omega_i$, as being the frequencies of perfect transmission, now set $Y_{in} = 1$. This gives a set of six equations for each channel consisting of a constant term in $\alpha^{-1}$, a constant term and an $\omega_i$ term in $\alpha^{-2}$, and a constant term, an $\omega_i$ term and an $\omega_i^2$ term in $\alpha^{-3}$. Unfortunately there are only five parameters per channel ($\gamma_{r02}$, $\gamma_{r12}$, $\beta_{r11}$, $\beta_{r13}$ and $\beta_{r23}$) so that these equations cannot be satisfied exactly. As stated earlier if any other parameters are introduced into the channel filters then they are either redundant or create additional higher ordered terms in $\omega_i$ in the $\alpha^{-1}$, $\alpha^{-2}$, and $\alpha^{-3}$ coefficients. The solution is handled hereinafter. For now we will investigate the limitations on the technique given by a partial solution, which will leave residual terms in $\omega_i\alpha^{-3}$. The six sets of equations to be solved are as follows:

$\alpha^{-1}$ term $$C_{r1}\beta_{r11} - \sum_{m=1 \neq r}^{n} \frac{1}{C_{m1}(\Omega_r - \Omega_m)} = 0 \quad (19)$$

$\alpha^{-2}\omega_i$ term $$C_{r1}\gamma_{r12} - \sum_{m=1 \neq r}^{n} \frac{1}{C_{m1}(\Omega_r - \Omega_m)^2} = 0 \quad (20)$$

$\alpha^{-2}$ term $$\gamma_{r12} - \gamma_{r02} - (C_{r1}\beta_{r11})^2 = 0 \quad (21)$$

$\alpha^{-3}\omega_i^2$ term $$\frac{C_{r1}^2 C_{r2}\beta_{r23}}{J_{r1}^2} - \sum_{m=1 \neq r}^{n} \frac{1}{C_{m1}(\Omega_r - \Omega_m)^3} = 0 \quad (22)$$

$\alpha^{-3}$ term $$C_{r1}\beta_{r13} - \frac{C_{r2}\beta_{r23}}{J_{r1}^2} + 2C_{r1}\beta_{r11}\gamma_{r12} - \gamma_{r02}C_{r1}\beta_{r11} - (C_{r1}\beta_{r11})^3 - \quad (23)$$

$$\sum_{m=1 \neq r}^{n} [\frac{-\gamma_{m02}}{C_{m1}(\Omega_r - \Omega_m)} + \frac{\beta_{m11}}{C_{m1}(\Omega_r - \Omega_m)^2} + \frac{J_{m1}^2}{C_{m1}^2 C_{m2}(\Omega_r - \Omega_m)^3}] = 0$$

Residual $\alpha^{-3}\omega_i$ term $$G_r = [-\frac{2C_{r1}C_{r2}\beta_{r23}}{J_{r1}^2} + 2C_{r1}^2\beta_{r11}\gamma_{r12}]\omega_i \quad (24)$$

where the input admittance is expressed as $$Y_r(\Omega_r\alpha + \omega_i) = 1 + G_r\alpha^{-3} + \epsilon(\alpha^{-4}) \quad (25)$$

Equations (19-22) give the values of $\beta_{r11}$, $\gamma_{r12}$, $\gamma_{r02}$, and $\beta_{r23}$ immediately for $r + 1 \rightarrow n$. These values may then be substituted into equation 23 to give a closed form solution for the $\beta_{r13}$ terms. Finally, substitution into equation 24 gives the value of $G_r$ as;

$$G_r = 2[\sum_{m=1 \neq r}^{n} \frac{1}{C_{m1}(\Omega_r - \Omega_m)} \cdot \sum_{m=1 \neq r}^{n} \frac{1}{C_{m1}(\Omega_r - \Omega_m)^2} - \quad (26)$$

-continued $$\frac{1}{C_{rl}} \sum_{m=1 \neq r}^{n} \frac{1}{C_{ml}(\Omega_r - \Omega_m)^3} ]\omega_i$$

Hereinbefore it was mentioned that there are inherent limitations to the canonic matching of a multiplexer consisting of a number of filters connected directly in series or parallel. We may define canonic matching as that requiring only changes to the parameters of the filters, and not adding extra immittance compensation networks. Herein immittance compensation is introduced, but in a way which not only preserves the canonic form of the network, but assists in the physical construction by spacing the filters along a manifold. The phase shifters between channels are sufficient to compensate the multiplexer to such an extent that contiguous channelling cases are designable by the theory.

Hereinbefore, the equations up through equation 26 have been developed on the basis of a directly-coupled multiplexer. The theory now develops for a manifold multiplexer wherein the equations up through equations 15–17 comply. These equations define the in-band and out-of-band input admittances of the channel filters. In the following description reference is made to FIGS. 1–4 for definitions of certain terminology. However, rather then employing direct parallel connection as in the embodiment of FIGS. 1–4 there is formed the manifold multiplexer depicted in FIG. 5. $Y_m(\omega)$ is the input admittance of the mth channel as a function of frequency. The transfer matrix of the mth, unity impedance phase shifter may be written as;

$$\frac{1}{\sqrt{1 + B_m^2 \alpha^{-2}}} \begin{bmatrix} 1 & jB_m\alpha^{-1} \\ jB_m\alpha^{-1} & 1 \end{bmatrix} \quad (27)$$

where
$$\theta_m = \tan^{-1}(B_m \alpha^{-1}). \quad (28)$$

Initially the manifold is assumed to be frequency independent and of uniform impedance. Modifications to the design process will be made at a later stage to account for the frequency dependence of the manifold. Note that as $\alpha \to \infty$ (the case of decoupled channels), $\theta_m \to 0$ or an integral multiple of $\pi$, i.e. the channels are effectively connected in parallel as in FIGS. 1–4. $\alpha = 1$ gives the actual situation to be determined.

An additional n parameters $B_1, B_2 \ldots B_n$ appear to have been obtained by connecting the filters on to a manifold, but later it will be shown that one of these is redundant.

If the $r^{th}$ channel is in-band, then;

$$Y_r = Y_r(\Omega_r \alpha + \omega_i) \quad (29)$$

a given previously by equation 15 while the admittance of the rest of the channels which are out-of-band are given by;

$$\overline{Y}_m = Y_m(\Omega_m \alpha + \omega_i) \quad (30)$$

with $m = 1, r-1, r+1, n$ and $\overline{Y}_m$ is given by equation 17. The transfer matrix of the network at the set of frequencies $(\Omega_r \alpha + \omega_i)$ will now be derived. The transfer matrix for the mth channel admittance followed by the mth phase shifter is, $$[T_m] = \frac{1}{\sqrt{1 + B_m^2 \alpha^{-2}}} \begin{bmatrix} 1 & jB_m\alpha^{-1} \\ jB_m\alpha^{-1} + \overline{Y}_m 1 + \frac{\alpha^{-2}B_m}{C_{ml}(\Omega_r - \Omega_m)} & -\frac{\omega_i \alpha^{-3}B_m}{C_{ml}(\Omega_r - \Omega_m)^2} \end{bmatrix} \quad (31)$$

and the matrix possesses an error of order $\alpha^{-4}$.

For the first $r-1$ channels we have a transfer matrix $$\frac{1}{F} \begin{bmatrix} A & B \\ C & D \end{bmatrix} = \prod_{m=1}^{r-1} [T_m] \quad (32)$$

where by analysis, for errors up to $\alpha^{-4}$, we have a lossless transfer matrix of the form;

$$F = 1 + \tfrac{1}{2} \sum_{m=1}^{r-1} B_m^2 \alpha^{-2} \quad (33)$$

$$A = 1 + a_1 \alpha^{-2} - a_2 \omega_i \alpha^{-3}$$

$$B = j \sum_{m=1}^{r-1} B_m \alpha^{-1} + j b_1 \alpha^{-3}$$

$$C = j \sum_{m=1}^{r-1} B_m \alpha^{-1} + \sum_{m=1}^{r-1} \overline{Y}_m - j c_1 \alpha^{-3}$$

$$D = 1 + d_1 \alpha^{-2} - \omega_i d_2 \alpha^{-3}$$

where $$a_1 = \sum_{m=2}^{r-1} \frac{\sum_{i=1}^{m-1} B_i}{C_{ml}(\Omega_r - \Omega_m)} - \sum_{m=2}^{r-1} \left( B_m \sum_{i=1}^{m-1} B_i \right) \quad (34)$$

$$a_2 = \sum_{m=2}^{r-1} \frac{\sum_{i=1}^{m-1} B_i}{C_{ml}(\Omega_r - \Omega_m)^2}$$

$$b_1 = \sum_{m=2}^{r-1} B_m \cdot \left[ \sum_{j=2}^{m} \frac{\sum_{i=1}^{j-1} B_i}{C_{jl}(\Omega_r - \Omega_j)} - \sum_{j=2}^{m-1} (B_j \sum_{i=1}^{j-1} B_i) \right]$$

$$c_1 = \sum_{m=2}^{r-1} \left[ \left( \frac{1}{C_{ml}(\Omega_r - \Omega_m)} - B_m \right) \cdot \left( \sum_{j=1}^{m-1} \frac{\sum_{i=j}^{m-1} B_i}{C_{jl}(\Omega_r - \Omega_j)} - \sum_{j=2}^{m-1} (B_j \cdot \sum_{i=1}^{j-1} B_i) \right) \right]$$

$$d_1 = \sum_{m=1}^{r-1} \frac{\sum_{i=m}^{r-1} B_i}{C_{ml}(\Omega_r - \Omega_m)} - \sum_{m=2}^{r-1} (B_m \cdot \sum_{i=1}^{m-1} B_i)$$

$$d_2 = \sum_{m=1}^{r-1} \frac{\sum_{i=m}^{r-1} B_i}{C_{ml}(\Omega_r - \Omega_m)^2}$$

We may proceed with a similar analysis for the network after the rth channel. However, we require only the input admittance which is given by $$Y_L = C'/A' \tag{35}$$

with $$A' = 1 + a_1' \alpha^{-2} - a_2' \omega_i \alpha^{-3} \tag{36}$$

$$C = j \sum_{m=r}^{n} B_m \alpha^{-1} + \sum_{m=r+1}^{n} \overline{Y}_m - j C_1' \alpha^{-3}$$

where $$a_1' = \sum_{m=r+1}^{n} \frac{\sum_{i=r}^{m-1} B_i}{C_{m1}(\Omega_r - \Omega_m)} - \sum_{m=r+1}^{n} (B_m \cdot \sum_{i=r}^{m-1} B_i)$$

$$a_2' = \sum_{m=r+1}^{n} \frac{\sum_{i=r}^{m-1} B_i}{C_{m1}(\Omega_r - \Omega_m)^2} \tag{37}$$

$$C_1' = \sum_{m=r+2}^{n} \left[ \left( \frac{1}{C_{m1}(\Omega_r - \Omega_m)} - B_m \right) \left( \sum_{j=r+1}^{m} \frac{\sum_{i=j}^{m-1} B_i}{C_{j1}(\Omega_r - \Omega_j)} \sum_{j=r+1}^{m} (B_j \cdot \sum_{i=r}^{j-1} B_i) \right) \right]$$

and $Y_L$ is a reactance function up to the order $\alpha^{-4}$.

Figure 6:
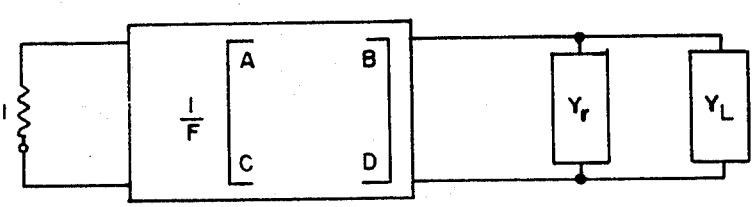
FIG. 6 depicts an approximate equivalent circuit of the manifold at frequencies in the $r^{th}$ channel passband.

FIG. 6 shows the approximate equivalent circuit of the manifold at frequencies in the rth channel passband. At the set of frequencies $\omega = \Omega_r \alpha + \omega_i$ we require the common port reflection coefficient and the rth channel port reflection coefficient to be zero. Since up to the order of approximation the networks given by equations 32 and 35 are lossless, we need only apply the condition of a conjugate match at any plane in the network. Applying this condition at the junction with the rth port we have, $$Y_r = \frac{A - C}{D - B} - \frac{C}{A'} \tag{38}$$

Expanding the right hand side of the equation as a power series in $\alpha^{-1}$ and comparing with the expansion of $Y_r$ in equation 15 yields, (1) $\alpha^{-1}$ term (39)

$$C_{r1}\beta_{r11} = \sum_{m=1 \neq r}^{n} \frac{1}{C_{m1}(\Omega_r - \Omega_m)} - \sum_{m=r}^{n} B_m$$

(2) $\alpha^{-2}\omega_1$ term (40)

$$\gamma_{r12} C_{r1} = \sum_{m=1 \neq r}^{n} \frac{1}{C_{m1}(\Omega_r - \Omega_m)^2}$$

(3) $\alpha^{-2}$ term (41)

$$\gamma_{r12} - \gamma_{r02} - C_{r1}^2 \beta_{r11}^2 = a_1 - d_1 - \sum_{m=1}^{r-1} B_m \cdot \sum_{m=1}^{r-1} \frac{1}{C_{m1}(\Omega_r - \Omega_m)}$$

(4) $\alpha^{-3}\omega_i^2$ term (42)

$$\frac{C_{r1}^2 C_{r2} \beta_{r23}}{J_{r1}^2} = \sum_{m=1 \neq r}^{n} \frac{1}{C_{m1}(\Omega_r - \Omega_m)^3}$$

(5) $\alpha^{-3}\omega_i$ term (43)

$$\frac{-2C_{r1}C_{r2}\beta_{r23}}{J_{r1}^2} + 2C_{r1}^2 \beta_{r11}\gamma_{r12} = d_2 - a_2 + \sum_{m=1}^{r-1} B_m \cdot \sum_{m=1}^{r-1} \frac{1}{C_{m1}(\Omega_r - \Omega_m)^2}$$

(6) $\alpha^{-3}$ term $$C_{r1}\beta_{r13} - \frac{C_{r2}\beta_{r23}}{J_{r1}^2} + 2C_{r1}\beta_{r11}\gamma_{r12} - \gamma_{r02}C_{r1}\beta_{r11} - C_{r1}^3\beta_{r11}^3$$

$$= \sum_{m=1 \neq r}^{n} \left[ \frac{1}{C_{m1}(\Omega_r - \Omega_m)} \left( -\gamma_{mo2} + \frac{\beta_{m11}}{(\Omega_r - \Omega_m)} + \frac{J_{m1}^2}{C_{m1}C_{m2}(\Omega_r - \Omega_m)^2} \right) \right]$$

$$+ c_1 + c_1' - a_1' \cdot \sum_{m=r+1}^{n} \frac{1}{C_{m1}(\Omega_r - \Omega_m)} + a_1' \sum_{m=r}^{n} B_m + b_1$$

$$- d_1 \sum_{m=1}^{r-1} \frac{1}{C_{m1}(\Omega_r - \Omega_m)} + (a_1 + d_1) \sum_{m=1}^{r-1} B_m - \left( \sum_{m=1}^{r-1} B_m \right)^2 \sum_{m=1}^{r-1} \frac{1}{C_{m1}(\Omega_r - \Omega_m)} \tag{44}$$

Applying the above set of equations for $r = 1 \to n$ leads to 6n equations with up to 6n unknowns. Since these are linear simultaneous equations we may attempt to obtain direct expressions for the unknown quantities.

Substituting for $a_2$ and $d_2$ from equations (34) into equation (43) gives:

$$-\frac{C_{r1}C_{r2}\beta_{r23}}{J_{r1}^2} + C_{r1}^2\beta_{r11}\gamma_{r12} = \sum_{m=1}^{r-1} \frac{\sum_{i=m}^{r-1} B_i}{C_{m1}(\Omega_r - \Omega_m)^2} \tag{45}$$

Defining a new function $P_r$ as:

$$P_r = \sum_{m=1\neq r}^{Q} \frac{1}{C_{m1}(\Omega_r - \Omega_m)^2} \cdot \sum_{m=1\neq r}^{Q} \frac{1}{C_{m1}(\Omega_r - \Omega_m)} - \frac{1}{C_{r1}} \cdot \sum_{m=1\neq r}^{n} \frac{1}{C_{m1}(\Omega_r - \Omega_m)^3} \quad (46)$$

and substituting for $\beta_{r23}$ and $\gamma_{r12}$ from equations (42) and (40) respectively into equation (45) results in the set of equations;

$$P_r - \sum_{m=r}^{n} B_m \cdot \sum_{m=1\neq r}^{n} \frac{1}{C_{m1}(\Omega_r - \Omega_m)^2} = \sum_{m=1}^{r-1} \frac{\sum_{i=m}^{r-1} B_i}{C_{m1}(\Omega_r - \Omega_m)^2} \quad (47)$$

$$(r = 1,2, \ldots n)$$

If $$H_r = \sum_{m=r}^{n} B_m \quad (48)$$

then equation (47) may be rearranged as;

$$H_r = \frac{P_r - \sum_{m=1}^{r-1} \frac{H_m}{C_{m1}(\Omega_r - \Omega_m)^2}}{\sum_{m=r+1}^{n} \frac{1}{C_{m1}(\Omega_r - \Omega_m)^2}} \quad (49)$$

and hence $H_r$ may be obtained for $r=1 \rightarrow n-1$. $H_n$ is, in general, indeterminate since the set of equations (47) on close inspection represent n equations with $n-1$ unknowns. From a network viewpoint this may readily be appreciated by considering the network shown in FIG. 5. The last phase shifter $\theta_n$ represents a frequency invariant reactance in parallel with the nth channel admittance $Y_n(\omega)$. Since this may be readily absorbed into the modification to the first admittance inverter and resonant frequency of the first cavity, this element is redundant and may be made zero, i.e.

$$B_n = 0 \quad (50)$$

In the very special case of the diplexer;

$$P_1 = \frac{(C_{11} - C_{12})}{C_{11}C_{12}^2(\Omega_1 - \Omega_2)^2}, P_2 = \frac{C_{12}}{C_{11}} P_1 \quad (51)$$

and consequently, $$P_2 - \frac{H_1}{C_{11}(\Omega_2 - \Omega_1)^2} = 0 \quad (52)$$

enabling both equations given in equation (47) to be satisfied. For the triplexer and above in the nth channel at the end of the manifold only 5 of the six conditions may be satisfied.

Combining equations (48) and (50) we have the final design for the manifold;

$$B_r = H_r - H_{r+1} \quad (53)$$
with $r = 1,2,\ldots n - 1$ and $H_n = 0$.

Having solved for $B_r$, we may then substitute into equation (39) to obtain $\beta_{r11}$ as;

$$\beta_{r11} = \frac{1}{C_{r1}} \left[ \sum_{m=1\neq r}^{n} \frac{1}{C_{m1}(\Omega_r - \Omega_m)} - \sum_{m=r}^{n} B_m \right] \quad (54)$$

and from equations (40) and (42)

$$\gamma_{r12} = \frac{1}{C_{r1}} \sum_{m=1\neq r}^{n} \frac{1}{C_{m1}(\Omega_r - \Omega_m)^2} \quad (55)$$

and $$\beta_{r23} = \frac{J_{r1}^2}{C_{r1}^2 C_{r2}} \sum_{m=1\neq r}^{n} \frac{1}{C_{m1}(\Omega_r - \Omega_m)^3} \quad (56)$$

Additionally, the substitution of equation (34) into (41) gives, $$\gamma_{r02} = \gamma_{r12} - C_{r1}^2 \beta_{r11}^2 + 2 \sum_{m=1}^{r-1} \frac{\sum_{i=m}^{r-1} B_i}{C_{m1}(\Omega_r - \Omega_m)} \quad (57)$$

In principle, the set of equations (44) may be used to obtain $\beta_{r13}$ but these contain very tedious algebra. Since these equations result from the $\alpha^{-3}$ term, they represent a fine adjustment to the matching of each channel around midband and in general this is more readily done by direct computer optimization of the circuit around the midband frequencies of each channel, as described below. Furthermore, since the term $\alpha^{-3}\omega_i$ could not be satisfied for the nth channel, such optimization leads to a slightly improved performance.

A further fine improvement in the design formulas may be obtained by closer inspection of the expansions for $Y_r$ and $Y_m$ as given in equations (15) and (17). If we assume that the resonant frequencies of all the resonators should be changed, then noting the format of equation (11), the following generalization is applied:

$$B_{rk} \rightarrow -C_{rk}(\Omega_r \alpha + \beta_{rkl}\alpha^{-l}) \quad (58)$$

where $l=2k-1$, $k=2,3,\ldots N_r$. Similarly if we assume that the admittance inverters should also change, then a generalization of equation (9) leads to $$J_{rk}^2 \rightarrow J_{rk}^2(1 - \gamma_{rkl}\alpha^{-l}) \quad (59)$$

where $l=2k$, $k=1,2,\ldots N_r - 1$. Now by expanding equations (15) and (17) to $\alpha^{-5}$ it becomes obvious that the extra correction terms above are associated only with the terms of highest degree in $\omega_i$ for each coefficient of $\alpha^{-l}$. Thus, in addition to equations (19), (20) and (22) which give (1) $\alpha^{-1}\omega_i^0$ term $$\beta_{r11} = \frac{1}{C_{r1}} \sum_{m=1\neq r}^{n} \frac{1}{C_{m1}(\Omega_r - \Omega_m)} \quad (60)$$

(2) $\alpha^{-2}\omega_i$ term $$\gamma_{r12} = \frac{1}{C_{r1}} \sum_{m=1\neq r}^{n} \frac{1}{C_{m1}(\Omega_r - \Omega_m)^2} \quad (61)$$

(3) $\alpha^{-3}\omega_i^2$ term $$\beta_{r23} = \frac{J_{r1}^2}{C_{r1}^2 C_{r2}} \sum_{m=1\neq r}^{n} \frac{1}{C_{m1}(\Omega_r - \Omega_m)^3} \quad (62)$$

we have also;

-continued (4) $\alpha^{-4}\omega_i^3$ term $$\gamma_{r24} = \frac{J_{r1}^2}{C_r^2 C_{r2}} \sum_{m-1 \neq r}^{n} \frac{1}{m_1(\Omega_r - \Omega_m)^4} \qquad (63)$$

and (5) $\alpha^{-5}\omega_i^4$ term $$\beta_{r35} = \frac{J_{r1}J_{r2}^2}{C_{r1}C_{r2}C_{r3}} \sum_{m=1 \neq r}^{n} \frac{1}{C_{m1}(\Omega_r - \Omega_m)^5} \qquad (64)$$

The general expression for the higher order terms is now apparent. Actually these are associated with the effect of the first resonators only of each out-of-band channel, since such resonators are responsible for the terms of highest degree in $\omega_i$.

At this point it is useful to summarize the design process step-by-step.

(1) Compute the values of $P_r$ given by equation (46).
(2) Compute the values of $H_r$ given by equation (49) for $r=1, 2, \ldots n-1$ and $H_n=0$.
(3) Then the $B_r$ are given by equation (53).
(4) The coefficients $\beta_{r11}$, $\gamma_{r12}$, $\beta_{r23}$, and $\gamma_{r02}$ are given by equations (54) through (57).
(5) The higher ordered correction terms $\gamma_{rkl}$ with $l=2k$ and $\beta_{rkl}$ with $l=2k-1$ which are defined in equations (58) and (59) are given by formulas such as in equations (63) and (64), which are easily generalized to give;

$$\gamma_{rkl} = \frac{1}{C_{rk}} \left( \prod_{s=1}^{k-1} \frac{J_{rs}^2}{C_{rs}^2} \right) \sum_{m=1 \neq r}^{n} \frac{1}{C_{m1}(\Omega_r - \Omega_m)^l} \qquad (65)$$

where $l=2k$ $$\beta_{rkl} = \frac{1}{C_{rk}} \left( \prod_{s=1}^{k-1} \frac{J_{rs}}{C_{rs}^2} \right) \sum_{m-1 \neq r}^{n} \frac{1}{C_{m1}(\Omega_r - \Omega_m)^l} \qquad (66)$$

where $l=2k-1$.

As stated earlier, in addition to the above design process a further refinement may be made to ensure that the best possible performance is obtained about the band centre frequencies. For out-of-band channels one may truncate the filters after two or three cavities to produce a purely reactive loading on the manifold. Define $\Omega_{rk}$ as the resonant frequency of the $k^{th}$ resonator of channel r. Then in the odd degree case $J_{r0}$ and $\Omega_{r1}$ may be slightly modified to produce a conjugate match at the junction with the manifold at midband. For the even degree case, $J_{r1}$ and $\Omega_{r2}$ in addition may be modified to produce a conjugate match at the two frequencies closest to midband. This updating process may be performed channel by channel and if necessary, may be repeated.

The Frequency-Dependent Manifold

Figure 5:
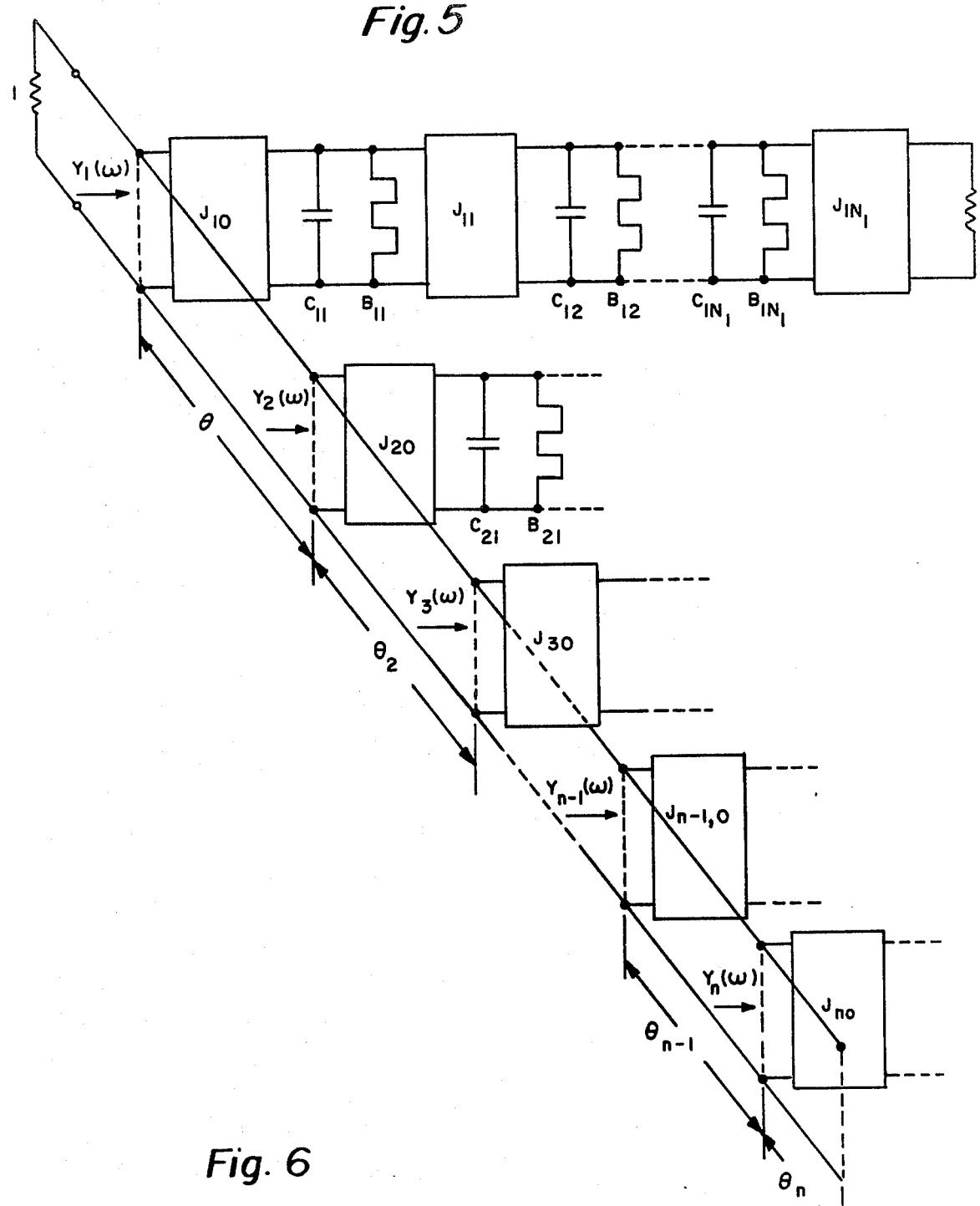
FIG. 5 shows a prototype manifold multiplexer in accordance with the invention employing phase shifters between channels.

The manifold multiplexer shown schematically in FIG. 5 indicates shunt-connected channels terminated in an open-circuited line. The electrical length between the $r^{th}$ channel and the termination is defined as $\psi_r$ at the frequency $\Omega_r$, leading to the general expressions indicated in the figure, valid at any frequency $\omega$. This circuit may be regarded as a prototype, and practical cases using a short circuit termination may be designed by including slight modifications, as described later.

Figure 7:
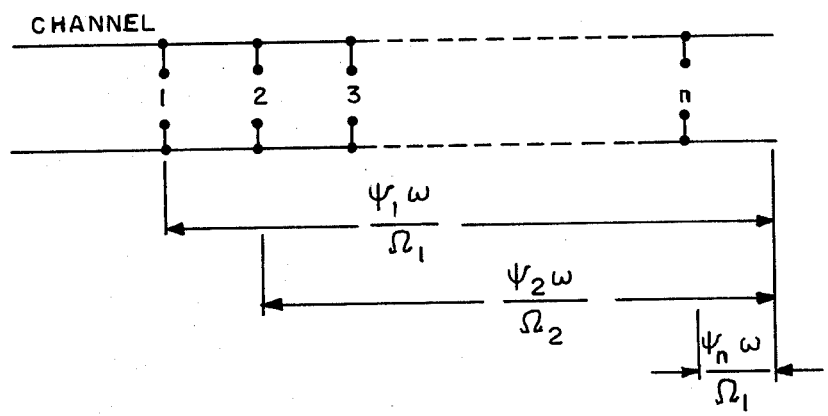
FIG. 7 schematically depicts the definition of the phase lengths with regard to a frequency dependent manifold.

In the frequency dependent case it is recognized that the most dominant terms involved in the design equations will be the lengths from each channel to the termination rather than the inter-channel spacings. The following transfer matrix is found to give an adequate representation of the $m^{th}$ electrical length (shown in FIG. 7):

$$T(\psi_m) = \frac{1}{\sqrt{1 + \alpha^{-2}\tan^2\left(\frac{\psi_m \alpha^{-1}\omega}{\Omega_m}\right)}} \begin{bmatrix} 1 & j\alpha^{-1}\tan\left(\frac{\psi_m \alpha^{-1}\omega}{\Omega_m}\right) \\ j\alpha^{-1}\tan\left(\frac{\psi_m \alpha^{-1}\omega}{\Omega_m}\right) & 1 \end{bmatrix} \qquad (67)$$

When $\alpha=1$, this matrix represents a length of transmission line. Hence the transformation $\alpha \rightarrow -\alpha$ does not change the sign of the electrical length (the B and C terms in equation (67) do not change sign), which is a physical requirement. It is known that the distance of each channel to the termination is close to an integral multiple of $\pi$ even for channels spaced fairly closely in frequency, so that the transfer matrix of equation (67) should not vary too rapidly with changes in inter-channel frequencies (i.e. with changes in $\alpha$). The essentially quadratic ($\alpha^{-2}$) dependence of this transfer matrix insures that the transfer matrix does indeed vary slowly with $\alpha$, and results in physically valid solutions.

The transfer matrix between channels m and m+1 is, by application of equation (67), given by;

$$T(\psi_m)T(-\psi_{m+1}) = \frac{1}{\sqrt{1+\alpha^{-2}\tan^2\phi_m}} \begin{bmatrix} 1 & j\alpha^{-1}\tan\phi_m \\ j\alpha^{-1}\tan\phi_m & 1 \end{bmatrix} \frac{1}{\sqrt{1+\alpha^{-2}\tan^2\phi_{m+1}}} \begin{bmatrix} 1 & j\alpha^{-1}\tan\phi_{m+1} \\ j\alpha^{-1}\tan\phi_{m+1} & 1 \end{bmatrix} \qquad (68)$$

$$= \frac{1}{\sqrt{1+\alpha^{-2}B_m^2}} \begin{bmatrix} 1 & j\alpha^{-1}B_m \\ j\alpha^{-1}B_m & 1 \end{bmatrix}$$

where at $\omega = \Omega_r \alpha + \omega i$ $$\left. \begin{aligned} \phi_m &= \frac{\psi_m}{\Omega_m}(\Omega_r + \omega_i \alpha^{-1}) \\ \phi_{m+1} &= \frac{\psi_{m+1}}{\Omega_{m+1}}(\Omega_r + \omega_i \alpha^{-1}) \end{aligned} \right\} \qquad (69)$$

-continued
$$B_m = \frac{\tan\phi_m - \tan\phi_{m+1}}{1 + \alpha^{-2}\tan\phi_m\tan\phi_{m+1}} \quad (70)$$

This implies that in the previous analysis for the frequency independent manifold $B_m$ should be replaced by the expression of equation (70) above, after expansion as a power series in $\alpha^{-1}$. Thus in the previous analysis we should replace the following quantities containing $B_m$ by the expression shown:

$$\alpha^{-1}\sum_{m=1}^{r-1} B_m = \alpha^{-1}\left[\tan\left(\frac{\psi_1}{\Omega_1}\Omega_r\right) - \tan\psi_r\right] + \quad (71)$$

$$\omega_i\alpha^{-2}\left[\frac{\psi_1}{\Omega_1}\sec^2\left(\frac{\psi_1}{\Omega_1}\Omega_r\right) - \frac{\psi_r}{\Omega_4}\sec^2\psi_4\right] + \alpha^{-3}\left(G_r + \right.$$

$$\left[\omega_i^2\left(\frac{\psi_1}{\Omega_1}\right)^2\tan\left(\frac{\psi_1}{\Omega_1}\Omega_r\right)\sec^2\left(\frac{\psi_1}{\Omega_1}\Omega_r\right) - \right.$$

$$\left.\left(\frac{\psi_r}{\Omega_r}\right)^2\tan\psi_r\sec^2\psi_r\right]\right\} + \epsilon(\alpha^{-4})$$

and $$\alpha^{-1}\sum_{m=r}^{n} B_m = \alpha^{-1}\tan\psi_r + \omega_i\alpha^{-2}\frac{\psi_r}{\Omega_r}\sec^2\psi_r + \alpha^{-3}\left[G_r' + \right. \quad (72)$$

$$\left.\omega_i^2\left(\frac{\psi_r}{\Omega_r}\right)^2\tan\psi_r\sec^2\psi_r\right] + \epsilon(\alpha^{-4})$$

Here $G_r$, $G_r'$ are undetermined coefficients of $\alpha^{-3}$ which are not required.

If the analysis of the manifold is modified accordingly, then equations (39) to (43) become;

$\alpha^{-1}$ term $$C_{r1}\beta_{r11} = \sum_{m=1\neq r}^{n}\frac{1}{C_{m1}(\Omega_r - \Omega_m)} - \tan\psi_r \quad (73)$$

$\alpha^{-2}\omega_i$ term $$\gamma_{r12}C_{r1} = \sum_{m=1\neq r}^{n}\frac{1}{C_{m1}(\Omega_r - \Omega_m)^2} + \frac{\psi_r}{\Omega_r}\sec^2\psi_r \quad (74)$$

$\alpha^{-2}$ term $$\gamma_{r02} = \gamma_{r12} - C_{r1}^2\beta_{r11}^2 + 2\sum_{m=1}^{r-1}\frac{\tan\left(\frac{\psi_m}{\Omega_m}\Omega_r\right) - \tan(\psi_r)}{C_{m1}(\Omega_r - \Omega_m)} \quad (75)$$

(see also (31))

$\alpha^{-3}\omega_i^2$ term $$\frac{C_{r1}^2 C_{r2}\beta_{r23}}{j_{r1}^2} = \sum_{m=1\neq r}^{n}\frac{1}{C_{m1}(\Omega_r - \Omega_m)^3} - \quad (76)$$

$$\left(\frac{\psi_r}{\Omega_r}\right)^2\tan\psi_r\sec^2\psi_r$$

$\alpha^{-3}\omega_i$ term $$-\frac{C_{r1}C_{r2}\beta_{r23}}{j_{r1}^2} + C_{r1}^2\beta_{r11}\gamma_{r12} = \quad (77)$$

$$\sum_{m=1}^{r-1}\frac{\tan\left(\frac{\psi_m}{\Omega_m}\Omega_r\right) - \tan\psi_r}{C_{m1}(\Omega_r - \Omega_m)^2} -$$

$$\sum_{m=1}^{r-1}\frac{\frac{\psi_m}{\Omega_m}\sec^2\left(\frac{\psi_m}{\Omega_m}\Omega_r\right) - \frac{\psi_r}{\Omega_r}\sec^2\psi_r}{C_{m1}(\Omega_r - \Omega_m)}$$

Substituting the equations (73), (74), and (76) into equation (77) and carrying out some algebraic modifications, the results in the equation;

$$P_r = \sum_{m=r+1}^{n}\frac{\tan\left(\frac{\Omega_m}{\Omega_r}\psi_r\right)}{C_{m1}(\Omega_r - \Omega_m)^2} + \frac{\psi_r}{\Omega_4}\tan\psi_r\sec^2\psi_r + \quad (78)$$

$$\sum_{m=1}^{r-1}\frac{\tan\psi_m}{C_{m1}(\Omega_r - \Omega_m)^2}$$

where $P_r$ is defined as in equation (46), $r=1, 2, \ldots n$.

For $r=1$, the only unknown appearing in this transcendental equation is $\psi_1$ which may be obtained iteratively using, for example, the Newton-Raphson technique for a solution around any integral number of $\pi$ radians.

Having obtained $\psi_1$, equation (78) may then be solved for $\psi_2$ with $r=2$ under the restriction $$\frac{\psi_r}{\Omega_r} < \frac{\psi_{r-1}}{\Omega_{r-1}} \quad (79)$$

which is necessary to ensure that a positive length of line separates the two channels along the manifold. This process may be repeated until $r=n-1$, but for $r=n$ the first term on the right hand side of equation (78) disappears and a solution to the equation may be difficult to obtain. This corresponds closely to the result obtained in the frequency independent manifold case. Normally $\psi_n$ would be chosen to be zero.

From the values of $\psi_r$, equations (73) to (76) may then be used to obtain the remaining design parameters and a simple updating process commencing with the nth channel will ensure a good passband match near to the band centre of each channel.

Frequently it may be desirable to terminate the manifold in a short circuit approximately $\pi/2$ radians from the last channel. This is achieved readily by replacing $$\tan\theta - \cot\theta = \tan(\theta - \pi/2) \quad (80)$$

in equations (73) to (78) resulting in an increase in each value of $\psi_r$ by approximately $\pi/2$.

These equations have been programmed and applied to the design of several multiplexers having either widely spaced or contiguous channels. As an example of the latter a 10-channel manifold was designed in WR75 to divide the 14–14.5 GHz band into 10 contiguous channels. The doubly-terminated prototype filters were selected to have 6 cavities with 22 dB return loss bandwidth of 43 MHz, and the channel center frequencies were spaced by 49 MHz (this gives 3 dB crossover points). The multiplexer synthesized from the design equations was analyzed on the computer, and showed results in good agreement with theory. In fact the worst return loss at the common port in the entire band is approximately 16 dB, occurring near the passband edges; most of the band has return loss of greater than 22 dB.

Figure 8A:
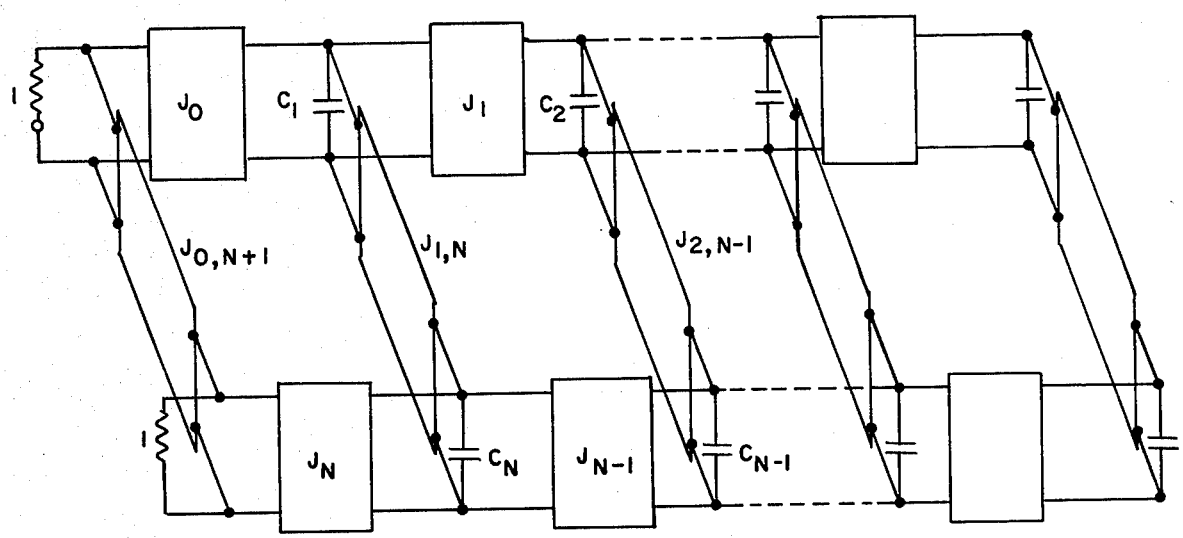
FIGS. 8A and 8B depict prototypes for the general even and odd degree filters, respectively.
Figure 8B:
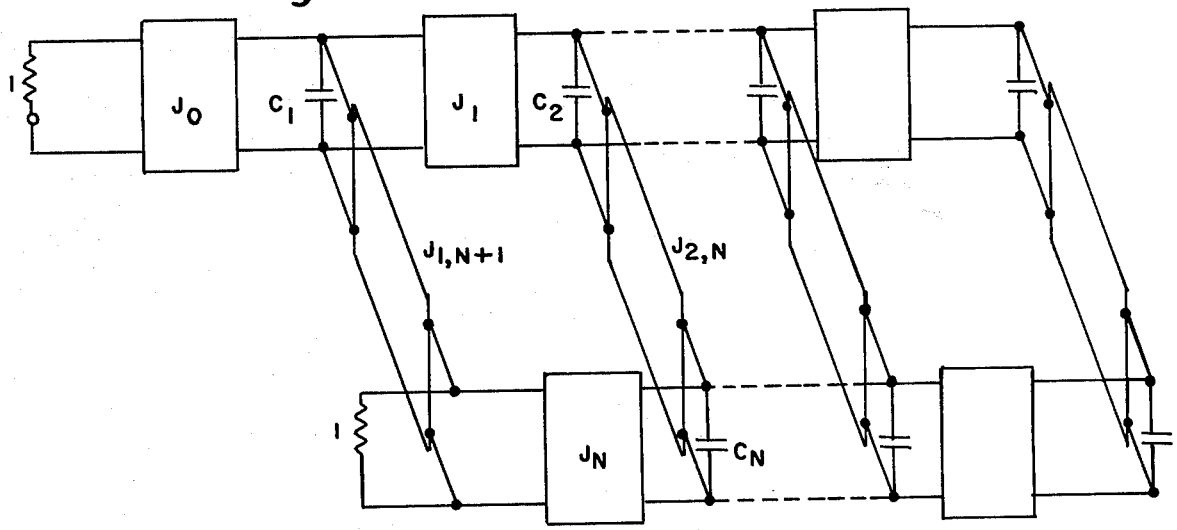

In the most general case of optimum equiripple filters having finite frequency transmission zeros and/or complex conjugate pairs of transmission zeros giving improved phase response, extra cross-couplings are utilized as designated by the cross-coupling admittance inverters included in the low-pass prototypes depicted in FIGS. 8A and 8B. The even degree case is shown in FIG. 8A, and the convenient asymmetric realization of the odd degree case is shown in FIG. 8B. These filters are often realized using dual-mode cavities to give convenient means of inclusion of the extra cross couplings. The question arises of how to treat the extra cross coupling inverters when such filters are multiplexed.

From a practical viewpoint filters will have at least 10 dB attenuation in the stopband and normally considerably more. This implies that the first cross-coupling is very small compared to the main line couplings, and for filters of degree greater than 2, the second cross-coupling will also be small. Thus in calculating the input impedance of the filter for the purposes of the multiplexer theory, the first and second cross-couplings may be ignored initially. Then, after calculating the correction terms for multiplexing it can be shown that the scaling factor for the correction on a cross-coupling $J_{kq}$ is the same at the scaling factor on $J_k$. For example, the correction factor on $J_k$ for the $r^{th}$ channel is given by equation (59) as $(1-\gamma_{rkl})^{\frac{1}{2}}$, so that the corresponding cross-coupling admittance inverter changes accordingly as $$J_{(r)kq} \rightarrow J_{(r)kq}(1-\gamma_{rkl})^{\frac{1}{2}} \quad (81)$$

$$k=1,2,\ldots N_r-1$$

Here the subscript r has been added in parentheses to indicate the $r^{th}$ channel.

Figure 9:
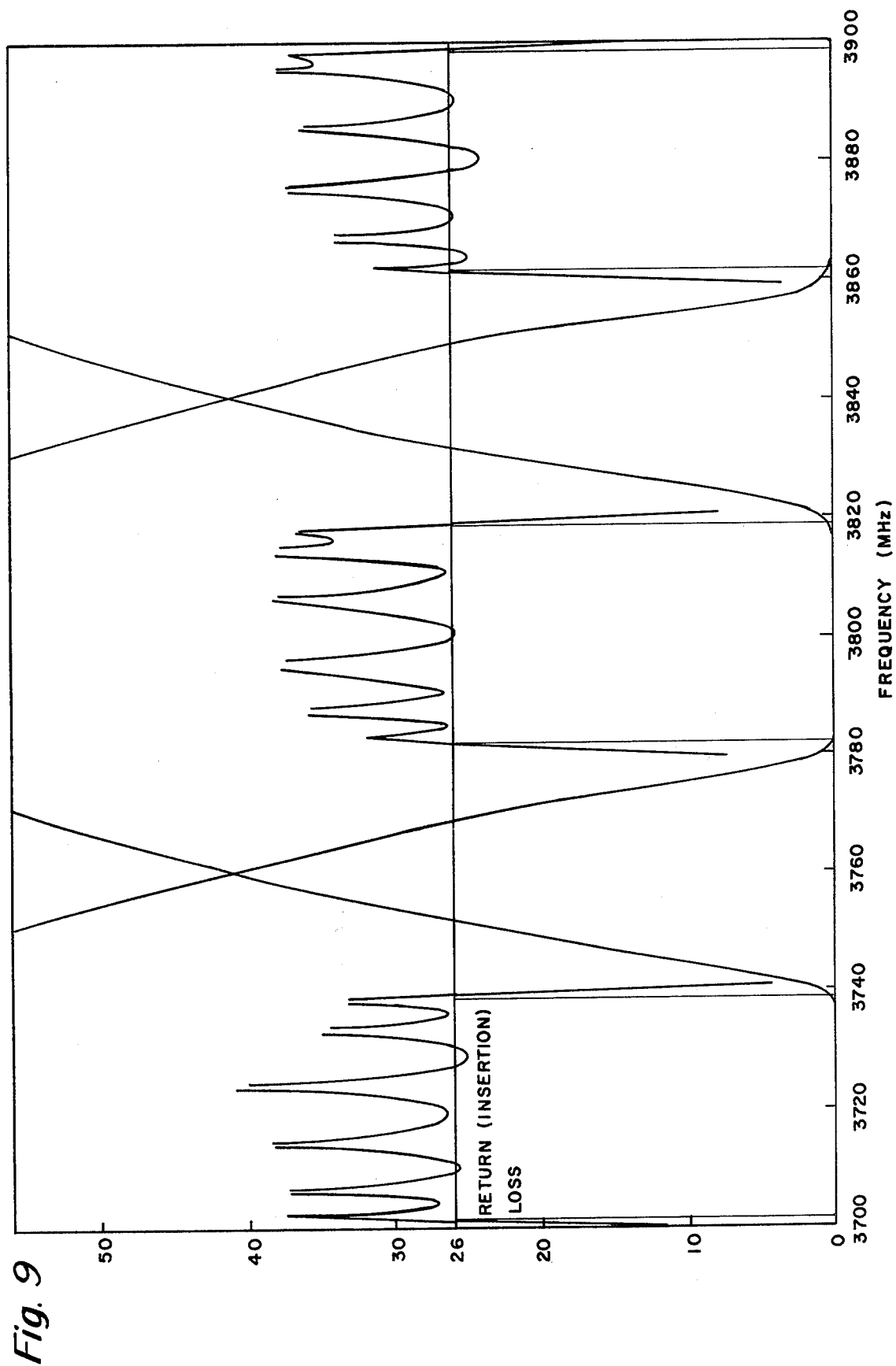
FIG. 9 shows graphs of return loss and insertion loss for a waveguide manifold triplexer in one example in accordance with the invention.

The theory described previously may be applied to the design of a waveguide WR229 manifold triplexer. Each channel consists of a 37 MHz bandwidth 6-cavity Chebyshev filter having ripple return loss 26 dB (VSWR 1.1) with center frequencies at 3720, 3800, and 3880 MHz. Although this is not a severe contiguous or nearly-contiguous case, it is far from trivial from a design viewpoint because the 26 dB return loss is relatively difficult for a multiplexer. The theoretical performance is shown in FIG. 9, which gives the common port return loss and channel insertion losses of the triplexer, taking all practical effects into account. It is seen that all six return loss poles are present in each channel, and the return loss minima are close to the specified level of 26 dB. The physical spacing between channels was approximately one guide wavelength to allow the filters to be arranged all on one side of the manifold. However, in another version in accordance with the invention filters are disposed on both sides of the manifold. Furthermore, the concepts of this invention may also be used where the bandpass filters are not necessarily in normal order or in other words the bands need not increase or decrease from one end of the manifold to the other in direct sequence.

The measured performance was very close to the theoretical prediction, and no problems were experienced in obtaining the five ripples at the 1.1 VSWR level in each channel. In particular, no empirical adjustments to the waveguide manifold were required, e.g. in the relative spacing between the channels. This has been the case also for several manifold multiplexers of this type, made in a variety of waveguide sizes.

A new design process has been presented for bandpass channel multiplexers where the channel filters are separated along a manifold. The design process has been found to be valid for large variety of channel separations from very large guardbands down to contiguous channel operation. In addition to the design process being canonic (i.e. the total degree of the multiplexer is equal to the sum of the individual degrees of the channel filters), a significant improvement in channel performance is achieved over the individual channel filters operating in isolation. For the basic manifold prototype multiplexer with frequency-independent phase shifters theoretically there are no limitations upon the number of channels nor the complexity or type of channel filters used.

In practice the manifold will possess a transmission line frequency dependence, and modifications to the design process have been presented which are valid for fairly broad band operation. There are two limitations namely the maximum channel bandwidths and the maximum number of channels, latter normally being more restrictive due to the significant frequency dependence of a long manifold.

Examples have been given indicating that both input and output multiplexers suitable for most communication systems may readily be designed. Practical waveguide manifold multiplexers have been constructed, showing that the theory is reproduced in practice with no empirical adjustments being required to the location of the filters on the manifold.

It is also understood that in accordance with the invention devices can be constructed, in addition to waveguide, also in coax, stripline, or any other form of transmission line.

What is claimed is:

1. Electromagnetic signal multiplexer comprising;
a plurality of bandpass filters based upon a doubly-terminated prototype having different but adjacent frequency bands and each having at least one filter section, an energy coupling manifold means, and means coupling the bandpass filters to the manifold means at predetermined spaced locations therealong, including means for providing a phase shift of the manifold signal between spaced bandpass filters whereby additional immittance compensation is unnecessary, the phase shift being sufficient to match the manifold, the spacing of the filters being defined by the following equation:

$$P_r = \sum_{m=r+1}^{n} \frac{\tan(\frac{\Omega_m}{\Omega_r}\psi_r)}{C_{m1}(\Omega_r-\Omega_m)^2} + \frac{\psi_r}{\Omega_r}\tan\psi_r\sec^2\psi_r + \sum_{m=1}^{r-1}\frac{\tan\psi_m}{C_{m1}(\Omega_r-\Omega_m)^2}$$

2. Electromagnetic signal multiplexer as set forth in claim 1 wherein the bandpass filters and manifold are constructed in waveguide.

3. Electromagnetic signal multiplexer as set forth in claim 1 wherein each bandpass filter comprises a number of serially arranged cavity filters.

4. Electromagnetic signal multiplexer as set forth in claim 2 wherein the frequency bands of the filters are substantially contiguous.

5. Electromagnetic signal multiplexer as set forth in claim 2 wherein a guard band is provided between adjacent frequency bands.

6. Electromagnetic signal multiplexer as set forth in claim 2 wherein all filters extend from the same side of the manifold.

* * * * *